March 31, 1936.    H. H. WOOD    2,035,855
TELLTALE ROLLER BEARING CONSTRUCTION
Filed March 13, 1935    2 Sheets-Sheet 1
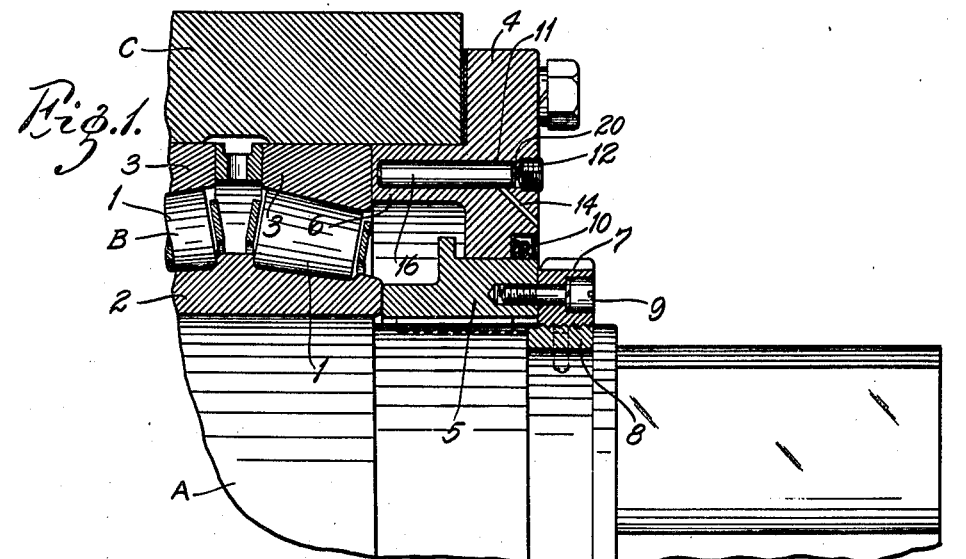
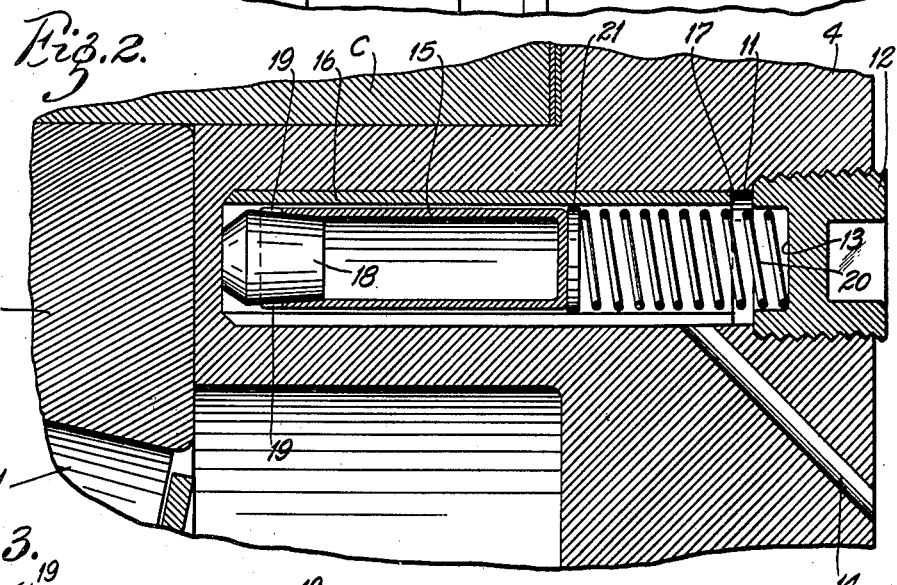
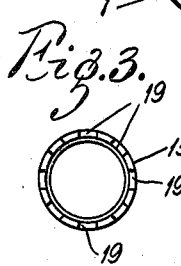
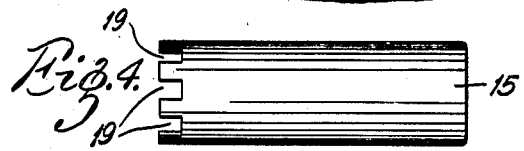
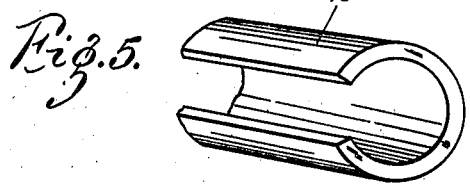
INVENTOR:
Henry H. Wood
HIS ATTORNEYS.

March 31, 1936.  H. H. WOOD  2,035,855
TELLTALE ROLLER BEARING CONSTRUCTION
Filed March 13, 1935   2 Sheets-Sheet 2
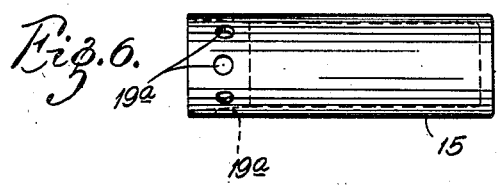
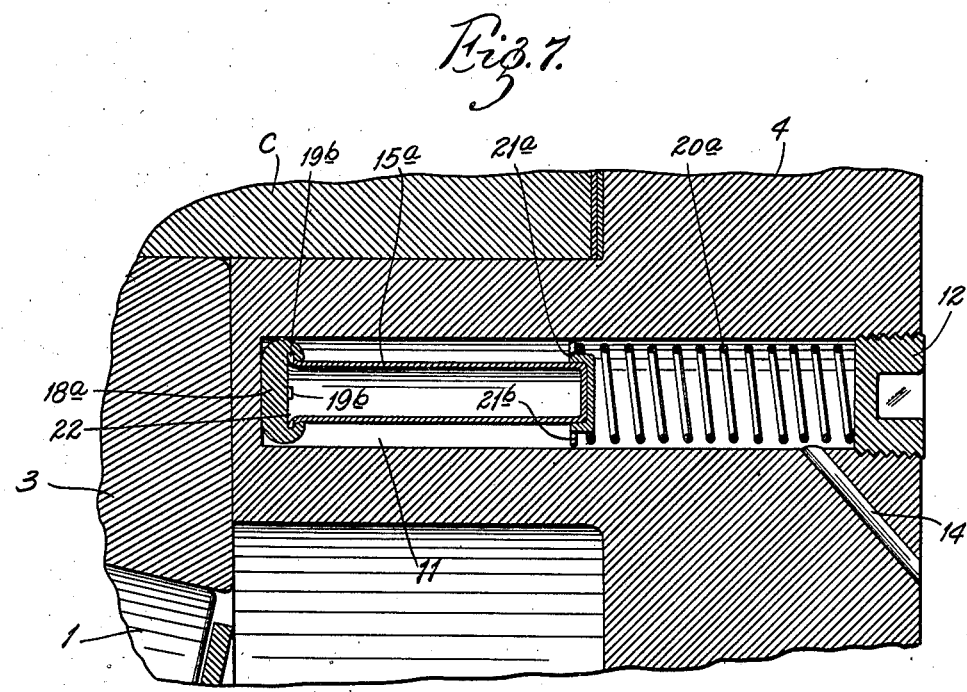
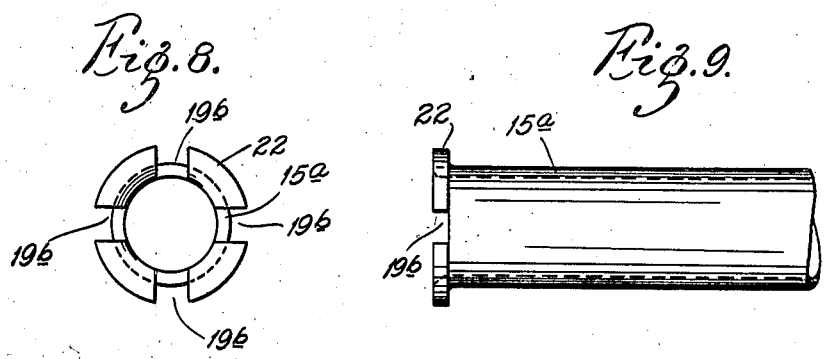
Henry H. Wood INVENTOR
HIS ATTORNEYS.

Patented Mar. 31, 1936

2,035,855

UNITED STATES PATENT OFFICE 2,035,855

TELLTALE ROLLER BEARING CONSTRUCTION

Henry H. Wood, Canton, Ohio, assignor to The Timken Roller Bearing Company, Canton, Ohio, a corporation of Ohio Application March 13, 1935, Serial No. 10,748

12 Claims. (Cl. 116—106)

This invention relates to roller bearing constructions of the kind that are equipped with thermic telltale devices for indicating an overheated condition of the bearing. The invention has for its principal objects to provide a simple and efficient telltale device of cheap and compact construction which can be readily incorporated in a roller or other antifriction bearing construction to indicate to the sense of sight and/or sense of smell an overheated condition of the bearing. The invention consists in the telltale device and in the construction, combinations and arrangements of parts hereinafter described and claimed.

In the accompanying drawings, which form part of this specification and wherein like symbols refer to like parts wherever they occur, Fig. 1 is a fragmentary vertical longitudinal section through a roller bearing mill roll construction equipped with a thermic telltale device embodying my invention, Fig. 2 is a similar view, showing the telltale and parts adjacent thereto on a large scale, Fig. 3 is an end view of the cartridge member of the telltale device, Fig. 4 is a side elevation of said cartridge, Fig. 5 is a perspective view of the split liner for the cartridge receiving bore in the end of the bearing housing, Fig. 6 is a side elevation of a modified form of cartridge, Fig. 7 is a view similar to Fig. 2, showing the mill roll bearing equipped with a telltale device of modified construction, Fig. 8 is a view looking at the open end of the cartridge shown in Fig. 7; and Fig. 9 is a side elevational view of said cartridge.

Referring to the accompanying drawings, my invention is shown in connection with a roller bearing mill roll construction; but it is also applicable to other antifriction bearing axles or shaft constructions. The roller bearing mill roll construction shown comprises a mill roll or shaft A rotatably supported near one end in an antifriction bearing, preferably a taper roller bearing B, enclosed in a suitable housing C. Said taper roller bearing comprises one or more series of conical rollers 1 interposed between a cone or inner raceway member 2 mounted on the roll A and a cup or outer raceway member 3 mounted in the bearing housing or enclosure C. In the construction shown, the bearing housing C is provided with a removable end closure comprising an annular plate 4, which is bolted to said housing, and a filler ring 5, which fits within said annular plate and is keyed to the roll A. The annular end closure plate 4 has an inwardly extending annular flange 6 disposed in abutting relation to the outer end of the bearing cup 3; and the filler ring 5 is disposed in abutting relation to the outer end of the bearing cone 2. The filler ring 5 is held in place by a ring nut 7, which is threaded on a split ring 8 pinned or otherwise nonrotatably secured in an annular groove provided therefor in the roll A. The ring nut 7 is locked in desired position of rotary adjustment by means of a screw 9 adapted to extend through any one of a series of holes in said nut into a threaded hole in the filler ring 5. A suitable oil seal 10 is mounted in the opening in the end closure plate 4 and cooperates with the filler ring 5 to prevent the escape of oil from and the entry of dust into the bearing housing C.

According to the present invention, the above bearing mill roll construction is equipped with a telltale or signal device for indicating to the sense of smell and/or sense of sight an overheated condition of the bearing. The telltale device is preferably mounted in a longitudinal bore 11 provided therefor in the annular end closure plate 4 opposite the outer end of the bearing cup 3. The bore 11 extends almost to the cup engaging surface of the end closure plate 4, leaving a relatively thin wall between the inner end of said bore and the bearing cup 3 through which heat from the bearing may be readily transmitted. The outer end of the bore 11 is closed by a threaded plug 12 provided at its inner face with a recess 13. An outlet or discharge passageway 14 inclines outwardly and downwardly from the bore 11 at a point located inwardly of the plug 12 to the outer surface of the end closure plate 4 and thus serves to establish communication between the bore and the atmosphere when the plug is in place.

The telltale device shown in Sheet 1 of the drawings comprises a hollow cylindrical container or cartridge 15 mounted in a longitudinally split tubular lining member 16 that is secured in the bore of the housing A as by a tack weld 17. The cartridge 15 is provided at its inner or bearing opposing end with a mouth or opening through which the container is adapted to be supplied with a suitable odoriferous and/or smoke producing compound. The opening at the inner end of the cartridge is closed by a tapered plug or stopper 18 made of a material adapted to fuse or melt at a predetermined temperature; and said inner end of said cartridge is provided with a series of circumferentially spaced notches 19. The filled cartridge 15 is pressed inwardly in the tubular liner 16, with the fusible end stopper 18 in contact with the inner end of the bore 11, by means of a coil spring 20 interposed between said cartridge and the plug or closure 12 for the outer end of said bore. The inner end of the spring 20 bears against a disk 21 of slightly larger diameter than the cartridge 15; and the outer end of said spring seats within the recess 13 provided therefor in the inner face of said plug.

With the above arrangement, in the event the roller bearing B becomes heated to a critical temperature due to defects or unusual conditions in the bearing assembly, the heat is transmitted from the bearing cup 3 to the fusible plug 18 through the thin wall of metal separating the cartridge receiving bore 11 from said cup. This heat is sufficient to melt the fusible closure or stopper 18 in contact with the inner end of the bore 11, thereby permitting the material in the cartridge to leave the cartridge through the mouth thereof and thence pass through the inclined outlet passageway 14 to the atmosphere where the smoke and odor produced by the escaping material constitute a warning signal which appeals to the sense of sight and sense of smell and thus indicates that the bearing requires attention.

When the fusible plug 18 melts, the spring 20 forces the open end of the cartridge 15 against the inner end of the bore 11. In this position of the cartridge, the material escapes therefrom through the notches 19 at the inner end thereof. In the modified construction shown in Fig. 6, the cartridge is provided with circumferentially spaced holes 19a, instead of the notches 19, through which the material may escape when the spring 20 forces the inner end of said cartridge against the inner end of the bore 11. The liner 16 is preferably positioned with its split in communication with the inner end of the outlet passageway 14, thereby affording clear passage for the material from the inner end of the bore 11 to said outlet passage.

In the construction shown in Figs. 7, 8 and 9, the cartridge 15a is provided with an outwardly flanged inner end 22 that is closed by means of a fusible disk 18a having its marginal edge crimped around said flange. The cartridge is held with its fusible closure in contact with the bottom of the bore 11 by means of a spring 20a interposed between the closure 12 for the outer end of said bore and a disk 21a provided with a circular seat for the outer end of the cartridge. The flanged inner end 22 of the cartridge has a series of radial openings 19b cut therethrough adapted, when said end of the cartridge is forced into engagement with the bottom of the bore 11, to permit the material to escape through these openings into the bore 11 and thence through the inclined discharge passageway 14 to the atmosphere. The disk 21a is provided with a series of peripheral notches 21b adapted to permit free flow of the material to said discharge passageway.

The above described telltale device is simple and inexpensive and can be quickly and easily applied to roller bearing axle and shaft constructions without material alteration thereof. The telltale device may be used repeatedly merely by refilling the cartridge and replacing the fusible closure therefor.

What I claim is:

1. In combination, a shaft, an antifriction bearing for said shaft, a housing for said bearing having a bore terminating close to said bearing, said bore having an opening into the atmosphere and a thermic telltale for said bearing, said telltale comprising a container mounted in said bore clear of said opening, said container being provided with an opening, and a fusible closure for the opening in said container.

2. In combination, a shaft, an antifriction bearing for said shaft, a housing for said bearing having a bore in communication with the atmosphere and terminating close to said bearing, and a thermic telltale for said bearing, said telltale comprising a container mounted in said bore and provided in the portion thereof nearest said bearing with an opening, a fusible closure for said opening, and means in said bore for holding said fusible closure against the inner end of said bore.

3. In combination, a shaft, an antifriction bearing for said shaft, a housing for said bearing, said housing having a recess terminating adjacent to said bearing, said recess having an opening into the atmosphere, and a thermic telltale device mounted in said recess, said device comprising a container mounted in said recess clear of said opening and adapted to contain a signaling material, and means in said recess operable by a predetermined temperature of said bearing to release the contents of said container into said recess.

4. In combination, a shaft, an antifriction bearing for said shaft, a housing for said bearing, said housing having a recess in communication with the atmosphere and terminating adjacent to said bearing, and a thermic telltale device mounted in said recess, said device comprising a container mounted in said recess and provided at its bearing opposing end with an opening, a fusible closure for said opening, and means in said recess cooperating with said container for forcing the same in the direction of said bearing.

5. In combination, a shaft, an antifriction bearing for said shaft, a housing for said bearing, said housing having a recess therein communicating with the atmosphere and terminating at its inner end close to said bearing, a container mounted in said recess and provided at its inner end with an opening, a fusible closure for said opening, and means in said recess for holding the fusible closure of said container against the inner end of said recess.

6. In combination, a shaft, a roller bearing for said shaft, a housing for said roller bearing provided adjacent thereto with a bore terminating close to said bearing, said bore having an opening into the atmosphere, and a thermic telltale device mounted in said bore clear of said opening, said device comprising a container provided at one end with an opening, and a fusible closure for the opening in said container, said container being mounted in said bore with the fusible closure facing the inner end of said bore.

7. In combination, a shaft, a roller bearing for said shaft, a housing for said roller bearing provided adjacent thereto with a bore terminating adjacent to said bearing, said bore having an opening into the atmosphere, and a thermic telltale device mounted in said bore, said device comprising a container provided at one end with an opening, and a fusible closure for the opening in said container, said container being mounted in said bore with the fusible closure bearing against the inner end of said bore.

8. In combination, a shaft, a roller bearing for said shaft, a housing for said roller bearing provided adjacent thereto with a bore in communication with the atmosphere and leading inwardly toward said bearing, and a thermic telltale device mounted in said bore, said device comprising a container mounted in said bore and provided at its inner end with an opening, a fusible closure for said opening, and a spring mounted in said bore and bearing against the outer end of said container for holding the fusible closure thereof in contact with the inner end of said bore.

9. In combination, a shaft, a roller bearing for said shaft, a housing for said roller bearing provided adjacent thereto with a bore in communication with the atmosphere, and a thermic telltale device mounted in said bore, said device comprising a container mounted in said bore and provided at its inner end with an opening, a fusible closure for said opening, and means in said bore for holding said container with its fusible closure in operative relation to said roller bearing, the closure receiving end of said container being provided with a series of laterally extending openings.

10. In combination, a shaft, a roller bearing for said shaft, a housing for said roller bearing provided with a bore extending inwardly from an exterior face thereof to a point adjacent to said bearing, a closure for the outer end of said bore, said housing being provided with an outlet passageway leading from said bore to the atmosphere, a container mounted in said bore and provided at its inner end with an opening, a fusible closure for said opening, and a spring interposed between the outer end of said container and the closure for the outer end of said bore for holding the fusible closure of said contained in contact with the inner end of said bore.

11. In combination, a shaft, a roller bearing for said shaft, a housing for said roller bearing provided with a bore extending inwardly from an exterior face thereof to a point adjacent to said bearing, a closure for the outer end of said bore, said housing being provided with an outlet passageway leading from said bore to the atmosphere, a liner mounted in said bore, said liner being split longitudinally and arranged with its split portion opposite the inner end of said discharge passageway, a container mounted in said liner and provided at its inner end with an opening, a fusible closure for said opening, and a spring interposed between the outer end of said container and the closure for the outer end of said bore for holding the fusible closure of said container in contact with the inner end of said bore.

12. In combination, a shaft, a roller bearing for said shaft, a housing for said roller bearing provided with a bore extending inwardly from an exterior face thereof to a point adjacent to said bearing, a closure for the outer end of said bore, said housing being provided with an outlet passageway leading from said bore to the atmosphere, a container mounted in said bore and provided at its inner end portion with end and side openings, a fusible closure for said openings, and a compressed coil spring interposed between the outer end of said container and the closure for the outer end of said bore.

HENRY H. WOOD.